June 5, 1951  W. J. CARTER  2,555,570
EXPANSIBLE PULLEY
Filed Dec. 13, 1949  2 Sheets-Sheet 1
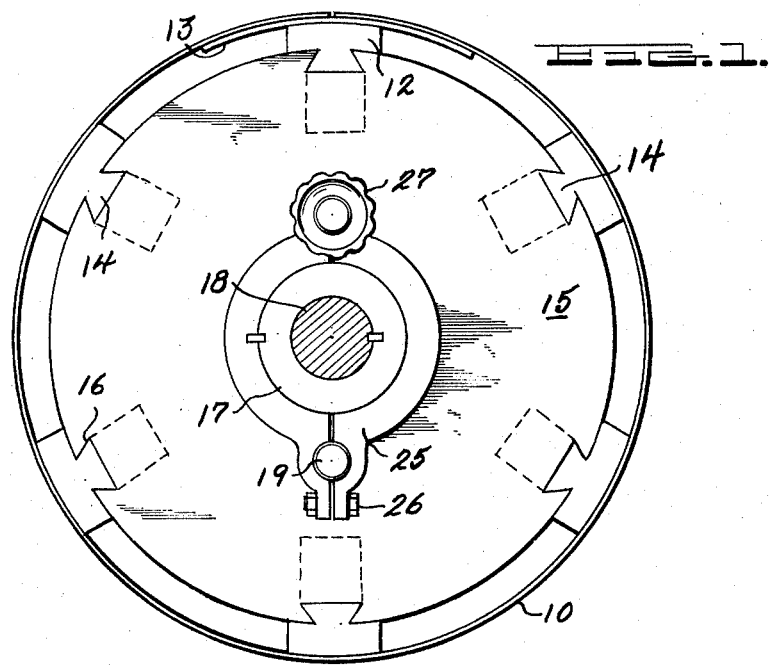
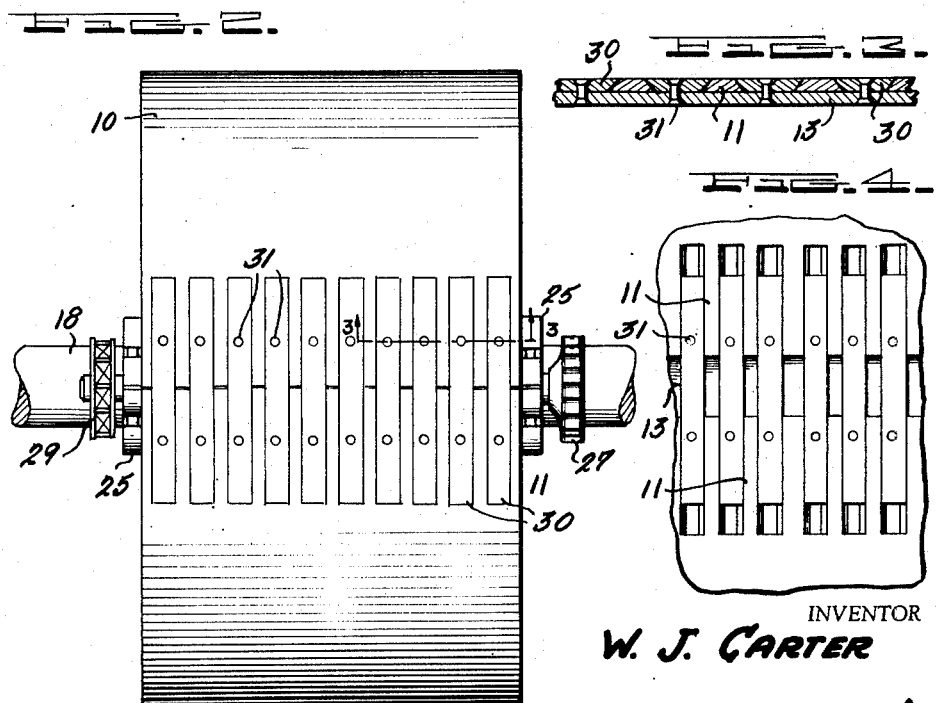
INVENTOR
W. J. CARTER
BY Adams + Bush
ATTORNEYS

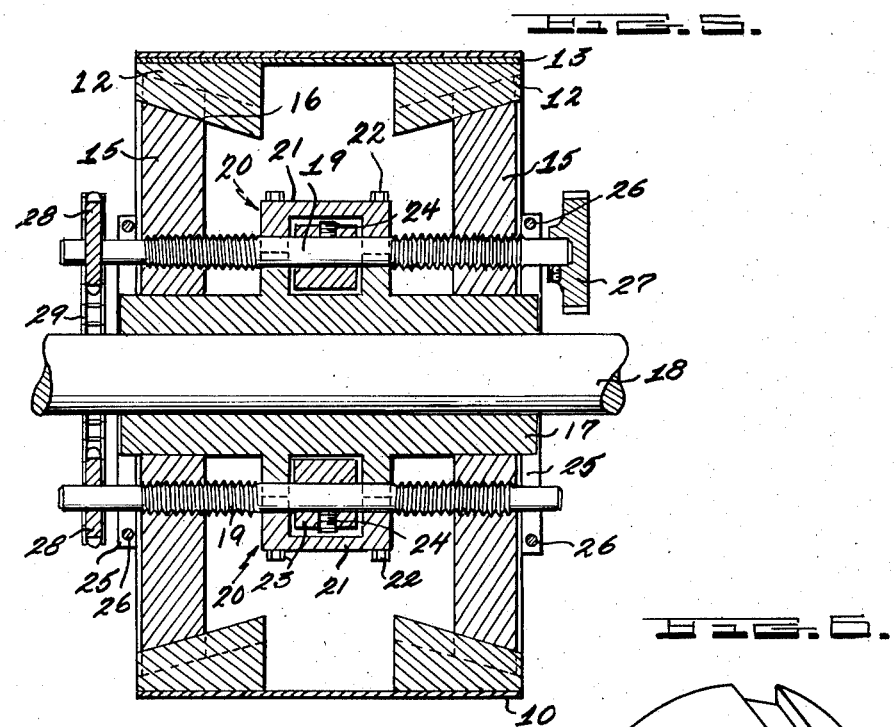
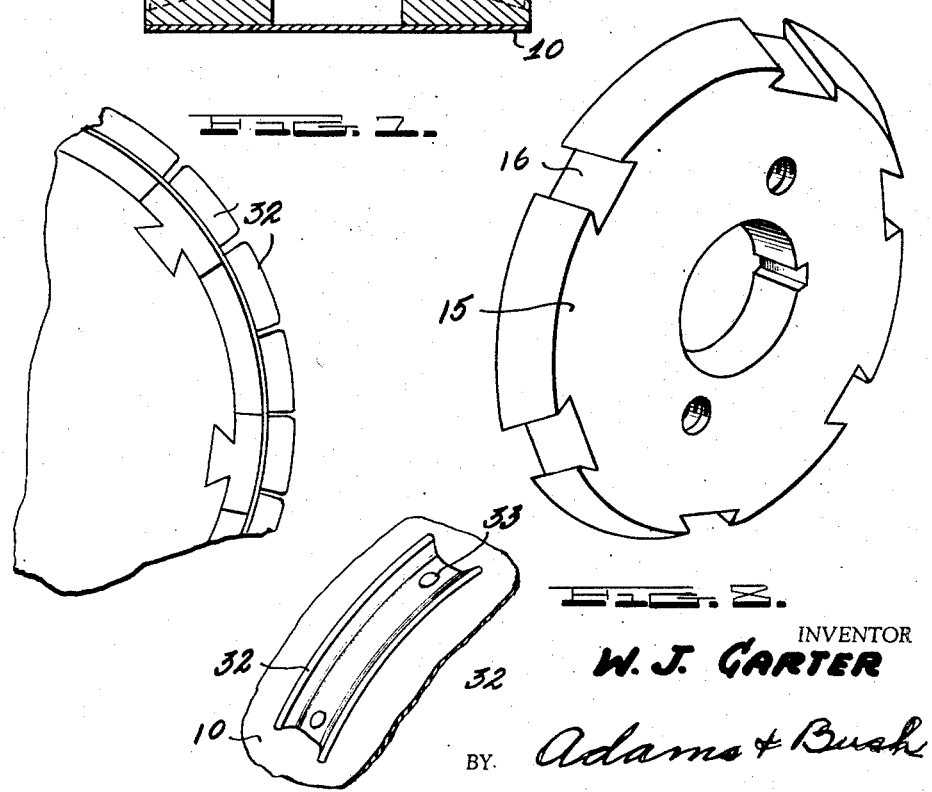

Patented June 5, 1951

2,555,570

UNITED STATES PATENT OFFICE 2,555,570

EXPANSIBLE PULLEY

William J. Carter, Macon, Ga.

Application December 13, 1949, Serial No. 132,730

8 Claims. (Cl. 74—230.16)

This invention relates to expansible pulleys of the type used in paper making machines and the like to change the speed of a driven shaft or of a drive shaft.

One of the objects of the invention is to provide an improved pulley of the character described having novel and simplified means for expanding and contracting the pulley rim.

Another object of the invention is to provide an improved pulley of the character described having screw-operated, bevelled expander members and wedges for expanding and contracting the pulley rim.

Another object of the invention is to provide an improved expansible pulley having a split rim provided with fingers at the joint and straps between the fingers to span the opening in the rim when the pulley is expanded.

Other aims and advantages of the invention will appear in the specification when considered in connection with the accompanying drawings, wherein:

Fig. 1 is a side elevation of one form of pulley embodying the invention;

Fig. 2 is a top plan view of the pulley shown in Fig. 1;

Fig. 3 is a fragmentary sectional view taken on the line 3—3 of Fig. 2;

Fig. 4 is a fragmentary top plan view showing the pulley rim expanded;

Fig. 5 is a vertical sectional view of the pulley shown in Fig. 1;

Fig. 6 is a perspective view of an expander member shown in Fig. 5;

Fig. 7 is a fragmentary side elevation of a modified form of pulley having V-belt guides; and Fig. 8 is a perspective view of one of the belt guides connected to the pulley rim.

Referring more particularly to the drawings, the illustrated form of expansible pulley is adapted for use in different types of machines, such as those used in paper making, wherein it is important that the speed of the driving or driven pulley be controlled very accurately to control the speed of the paper web. It is one of the principal objects of this invention to provide a simplified form of expansible pulley which can easily be expanded and contracted to control the speed of a driven shaft.

Referring more particularly to the drawings, the expansible pulley shown in Figs. 1 to 5 inclusive, is cylindrical and is designed to be driven by a flat belt. However, the invention is applicable to pulleys of other types, one modification for V-belt drives being shown in Figs. 7 and 8.

Referring to Figs. 1 to 4, the preferred form of the pulley is shown as embodying a cylindrical split rim 10, which is open along one element of the cylinder. It is preferably made of sheet metal and bent into cylindrical form and has a plurality of opposed circumferential fingers 11 on opposite sides of the split opening. In this example, the sheet metal cylinder is shown as having a plurality of pairs of wedge blocks 12 secured to its inner surface, six pairs of blocks being shown 60° apart around the inside of the rim. One pair of the wedges is mounted at the bottom of the rim, as shown in Fig. 1, and another pair is mounted inside the rim on an arcuate backing plate 13 beneath the split portion of the rim. The wedges are shown as having dovetail tongues 14 on their inner surfaces and are inclined from their outer ends toward their inner ends to cooperate with a pair of expander members, shown as being in the form of discs 15 at the opposite ends of the rim having dovetail grooves 16 coacting with the tongues. The dovetail tongues and grooves at the top and bottom, as shown in Figs. 1 and 6, extending in planes parallel with the axis of the pulley; while the tongues and grooves at the sides are inclined or biased with respect to the axis of the pulley to permit the rim to be expanded as the discs are moved inwardly against the wedge-shaped blocks 12. The inclined grooves are shown in Fig. 6. This prevents the discs from being locked on the tongues of the wedges. The pulley rim expands about the bottom portion as the center and the upper split portion is separated on the backing plate 13.

The expanding discs 15 are splined or slidably keyed on a cylindrical hub member 17 which is keyed or otherwise secured on the shaft 18, and they are adapted to be adjusted on the hub by means of a pair of screws 19 journaled in bearing boxes 20 carried by the hub. As shown in Fig. 5, the bearing boxes are made in the form of hollow bosses integral with the hub and cap members 21 secured to them by means of bolts 22. Each of the screws is shown as having a collar member 23 secured to its center portion by a set screw 24 to confine them to rotate in the journal boxes and prevent longitudinal movement thereof. The opposite end portions of the screws pass through screw threaded openings in the discs 15 and they have right and left hand threads, so that when the screws are rotated in one direction the discs will be moved outwardly and, when the screws are rotated in the opposite direction, the discs will be moved inwardly. When the discs are moved inwardly, as shown in Fig. 5, the rim of the pulley will be expanded, due to the wedge-shape of the blocks 12 and the dovetail tongue and groove connections between the bevelled discs and blocks. When the discs are moved outwardly, they will positively contract the rim.

In the present example, the two expanding screws are shown as having bearings at their opposite end portions in the form of pairs of collars 25 clamped and keyed on the opposite ends of the hub 17. The bearing members are shown as having their parts clamped together by bolts 26.

The screws are adapted to be operated simultaneously. In this example, one of the screws is shown as having an operating gear 27 at one end and both of the screws are shown as having sprockets 28 at their opposite ends connected by a sprocket chain 29. The arrangement is such that the screws can be operated while the pulley is running, by means of a motor operated gear carried by the shaft (not shown) meshing with the gear 27. Of course, the gear 27 can be used as a knob to be turned by hand when the pulley is stopped.

Referring to Figs. 1 to 4, inclusive, the fingers 11 on opposite sides of the split portion of the rim are formed by rectangular notches and these fingers are adapted to slide and expand on the curved backing plate 13. They are shown in Fig. 3 as being bevelled at their opposite ends and the backing plate 13 is shown as carrying straps 30 with bevelled edges fitted against the bevelled edges of the fingers to hold them in engagement with the backing plate. The straps 30 are welded or otherwise secured to the backing plate, rivets 31 being shown in Fig. 3. This prevents the fingers from spreading apart beyond the contour of the backing plate when the pulley is expanded. The expanded position of the pulley is shown in Fig. 4, with the fingers separated and the straps between them provide a rounded contour of the expanded pulley between the inner ends of the fingers.

Referring to Figs. 7 and 8, the pulley is adapted to be used for a V-belt drive. In that example, a series of grooved sheet metal members or channels 32 are shown as being secured to the rim in spaced circumferential rows. The separate channel members permit the rim to be expanded and contracted. They are shown as being secured to the rim by rivets 33.

From the foregoing description, it will be understood that the improved pulley is simple and rugged in construction, and is easily adjusted to different diameters. It is especially applicable to paper making machines and any other machines which require careful adjustment of the speeds of driving or driven shafts.

Obviously, the invention is not restricted to the particular embodiments herein shown and described. Moreover, it is not indispensable that all of the features of this invention be used conjointly, since they may be employed advantageously in various combinations and sub-combinations.

What is claimed is:

1. An expansible pulley comprising a split rim made of bendable sheet metal; pairs of wedge-shaped blocks at opposite ends of the pulley secured to the inner wall of the rim at spaced intervals around its periphery; a pair of bevelled expander members coacting with the wedge-shaped blocks at the opposite ends of the pulley; a hub on which the expander members are slidably secured; and a pair of screws having right and left hand threads at their opposite ends engaging the respective expander members.

2. An expansible pulley, as set forth in claim 1, wherein the rim is cylindrical and the split extends along one element of the cylinder.

3. An expansible pulley, as set forth in claim 1, wherein the wedge-shaped blocks and the bevelled expander members are slidably connected together by dovetail tongues and grooves and wherein the tongues and grooves on opposite sides of a diameter through the split portion are biased at an angle to permit the bendable portion of the rim to be expanded without locking.

4. An expansible pulley, as set forth in claim 1, wherein the expander members are in the form of discs having tongue and groove connections to the wedge blocks; and wherein the hub carries journal box bearings for said screws; thrust collars secured to the screws in said box bearings; an operating member on the outer end of one of said screws; and driving means connecting the screws to be rotated together.

5. An expansible pulley, as set forth in claim 1, wherein the expander members are in the form of discs having tongue and groove connections to the wedge blocks; and wherein the hub carries journal box bearings for said screws; thrust collars secured to the screws in said box bearings; an operating gear wheel on the outer end of one of said screws; and sprockets and a chain connecting the opposite ends of the screws to rotate them together.

6. An expansible pulley, as set forth in claim 1, wherein the sheet metal rim is cylindrical with the split across an element of the cylinder; and wherein an arcuate backing plate is mounted inside the split portion of the rim.

7. An expansible pulley, as set forth in claim 1, wherein the sheet metal rim is cylindrical with the split along an element of the cylinder; and wherein an arcuate backing plate is mounted inside the split portion of the rim, said split ends of the rim having opposed circumferential fingers with bevelled edges; and straps secured to the outer face of the backing plate having bevelled edges engaging the bevelled edges of said fingers to provide belt engaging surfaces at the opening when the rim is expanded.

8. An expansible pulley, as set forth in claim 1, wherein the rim is cylindrical with the split portion along one element of the cylinder; and wherein a plurality of spaced circumferential rows of V-shaped channels are secured to the rim to receive ordinary V belts.

WILLIAM J. CARTER.

REFERENCES CITED

The following references are of record in the file of this patent:

UNITED STATES PATENTS

| Number | Name | Date |
|---|---|---|
| 533,451 | Farnsworth | Feb. 5, 1895 |
| 965,160 | Cullman | July 26, 1910 |
| 1,110,804 | Little | Sept. 15, 1914 |

FOREIGN PATENTS

| Number | Country | Date |
|---|---|---|
| 92,480 | Germany | July 13, 1897 |